(12) United States Patent
Wang et al.

(10) Patent No.: US 11,153,496 B1
(45) Date of Patent: Oct. 19, 2021

(54) SOLAR MODULE DETECTION SYSTEM

(71) Applicants: Win Win Precision Technology Co., Ltd., Hsinchu (TW); IRUAV Technology Co., Ltd., Taoyuan (TW)

(72) Inventors: Cheng-Lien Wang, Hsinchu (TW); Szu Ming Chen, Hsinchu (TW); Yi Ching Chen, Hsinchu (TW)

(73) Assignees: Win Win Precision Technology Co., Ltd., Hsinchu (TW); IRUAV Technology Co., Ltd., Taoyuan (TW)

( * ) Notice: Subject to any disclaimer, the term of this patent is extended or adjusted under 35 U.S.C. 154(b) by 0 days.

(21) Appl. No.: 16/898,391

(22) Filed: Jun. 10, 2020

(30) Foreign Application Priority Data

May 6, 2020 (TW) .................................. 109115046

(51) Int. Cl.
| | |
|---|---|
| *G06T 7/00* | (2017.01) |
| *H04N 5/232* | (2006.01) |
| *H04N 5/247* | (2006.01) |
| *G01J 5/08* | (2006.01) |
| *G01J 5/00* | (2006.01) |

(52) U.S. Cl.
CPC ............ *H04N 5/23299* (2018.08); *G01J 5/08* (2013.01); *G06T 7/0002* (2013.01); *H04N 5/247* (2013.01); *G01J 2005/0077* (2013.01); *G01J 2005/0085* (2013.01); *G06T 2207/10048* (2013.01)

(58) Field of Classification Search
USPC ......................................... 382/149; 374/124
See application file for complete search history.

(56) References Cited

U.S. PATENT DOCUMENTS

| 8,373,758 B2* | 2/2013 | Guha .................... G06T 7/0004 |
| | | 348/164 |
| 9,217,767 B2* | 12/2015 | Mak ......................... H02S 50/10 |
| 10,402,671 B2* | 9/2019 | Abousleman ......... G06T 7/0008 |
| 2005/0252545 A1* | 11/2005 | Nowlan ................... H02S 50/10 |
| | | 136/243 |
| 2009/0238444 A1* | 9/2009 | Su .......................... G01M 11/00 |
| | | 382/149 |
| 2009/0297017 A1* | 12/2009 | Hudgings ............... G06T 7/001 |
| | | 382/141 |

(Continued)

OTHER PUBLICATIONS

Solarpower GmbH, Method and system for detecting defective solar modules, Machhine Translation, EP 2410319A1, pp. 1-5, Jul. 23, 2010.*

*Primary Examiner* — Ishrat I Sherali
(74) *Attorney, Agent, or Firm* — JCIPRNET

(57) ABSTRACT

A solar module detection system is provided. The solar module detection system includes a visible light image capturing device, a thermal image capturing device, a carrier, and a host. The visible light image capturing device captures a visible light image of a solar module along a moving path. The thermal image capturing device captures a thermal image of the solar module along the moving path. The carrier carries the visible light image capturing device and the thermal image capturing device and moves the visible light image capturing device and the thermal image capturing device according to the moving path. The host identifies a thermal abnormality condition of the solar module from the thermal image, determines a defect type of the thermal abnormality condition according to the visible light image, and displays the thermal abnormality condition and the defect type.

9 Claims, 3 Drawing Sheets

(56) References Cited

U.S. PATENT DOCUMENTS

| | | | |
|---|---|---|---|
| 2010/0182421 A1* | 7/2010 | Chidambaram | G01N 21/66 348/126 |
| 2012/0242321 A1* | 9/2012 | Kasai | G01J 5/089 324/72 |
| 2012/0318984 A1* | 12/2012 | Vanneau | G01J 5/02 250/340 |
| 2014/0184810 A1* | 7/2014 | Sekiguchi | H01L 27/1461 348/164 |
| 2014/0363054 A1* | 12/2014 | Noriega Gil | G06T 7/40 382/108 |
| 2015/0160138 A1* | 6/2015 | Takami | H02S 50/10 356/51 |
| 2015/0161779 A1* | 6/2015 | Hamann | G06T 3/0043 348/165 |
| 2016/0241905 A1* | 8/2016 | Gao | G06F 3/0482 |
| 2016/0246297 A1* | 8/2016 | Song | H04B 7/18506 |
| 2017/0019570 A1* | 1/2017 | Meller | G06T 7/001 |
| 2017/0277966 A1* | 9/2017 | Abousleman | G06T 7/13 |
| 2018/0003656 A1* | 1/2018 | Michini | H02S 50/10 |
| 2020/0041560 A1* | 2/2020 | Schwartz | G01R 31/085 |

\* cited by examiner

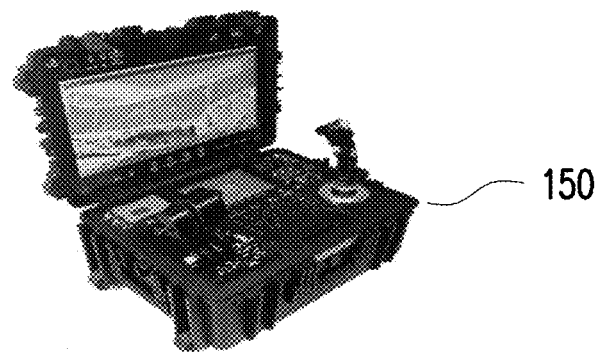

150

| | | | |
|---|---|---|---|
| System name | | Detection date | ▼ |
| Source catalog | | | Browse |
| Destination catalog | | | Browse |
| RAW | | % | Import |
| RGB | | % | |
| Import Verify | | | |

P1

Detection information

| | | | |
|---|---|---|---|
| Scene photo | | | Browse |
| Weather condition | | Wind speed (km/h) | |
| Irradiance(w/m²) | | Cloud cover(%) | |
| Flight height (m) | | Environment temperature(°C) | |
| Main detection personnel | | Assistant personnel | |
| Thermal imager pixel size | | Bit number | |

Environment information | Detection path

Reset   Save

SOLAR MODULE DETECTION SYSTEM

CROSS-REFERENCE TO RELATED APPLICATION

This application claims the priority benefit of Taiwan application serial no. 109115046, filed on May 6, 2020. The entirety of the above-mentioned patent application is hereby incorporated by reference herein and made a part of this specification.

BACKGROUND

Technical Field

The disclosure relates to a detection system, and in particular, to a solar module detection system that performs detection on a solar module.

Description of Related Art

In the related art, detection on a solar module may use a thermal image of the solar module in operation to determine whether the solar module has an abnormality and performs an appropriate operation on the abnormality.

However, the thermal image may change as affected by the environment and distances. For example, the thermal image may change due to shade of another subject, and a misjudgment on an abnormality condition is thereby produced. For another example, in the case that the thermal image is obtained by using a handheld thermal imager, the handheld thermal imager may receive sunlight reflected from the solar module due to an excessively short distance. In addition, when a solar module with a large area is to be detected, a long period of operation time for obtaining the thermal image of the solar module in operation is required. Therefore, how to improve accuracy of solar module detection and reduce operation time is one of the research subjects for persons skilled in the art.

SUMMARY

The disclosure provides a solar module detection system through which accuracy of solar module detection is enhanced and operation time is reduced.

A solar module detection system in the disclosure includes a visible light image capturing device, a thermal image capturing device, a carrier controller, a carrier, an environment sensing module, and a host. The visible light image capturing device is configured to capture a visible light image of at least one solar module along a moving path. The thermal image capturing device is configured to capture a thermal image of the at least one solar module in operation along the moving path. The carrier controller is configured to provide a configuration signal associated with the moving path. The carrier is configured to carry the visible light image capturing device and the thermal image capturing device, and move the visible light image capturing device and the thermal image capturing device along the moving path according to the configuration signal. The environment sensing module is configured to sense an environmental condition of the at least one solar module being detected. The host includes a display and a processor. The display is configured to display the thermal image and the visible light image. The processor is coupled to the display. The processor is configured to control the display to display the visible light image and the thermal image simultaneously, identify at least one thermal abnormality condition of the at least one solar module from the thermal image, and locally analyze and determine at least one defect type of the at least one thermal abnormality condition according to the visible light image and the environmental condition. The processor is further configured to control the display to display the at least one thermal abnormality condition and the at least one defect type.

Based on the above, the solar module detection system provided by the disclosure uses the carrier to carry the visible light image capturing device and the thermal image capturing device. The solar module detection system may capture the visible light image and the thermal image of the solar module along the moving path. In this way, in the disclosure, time required for capturing an image (that is, the visible light image and the thermal image) of the solar module in operation is reduced. In addition, the solar module detection system determines the defect type of the thermal abnormality condition from the thermal image through the visible light image. In this way, accuracy of solar module detection in the disclosure is enhanced.

In order to make the aforementioned and other objectives and advantages of the present disclosure comprehensible, embodiments accompanied with figures are described in detail below.

BRIEF DESCRIPTION OF THE DRAWINGS

FIG. 2 is a schematic view illustrating a carrier controller and an operation interface according to an embodiment of the disclosure.

DESCRIPTION OF THE EMBODIMENTS

Figure 1:
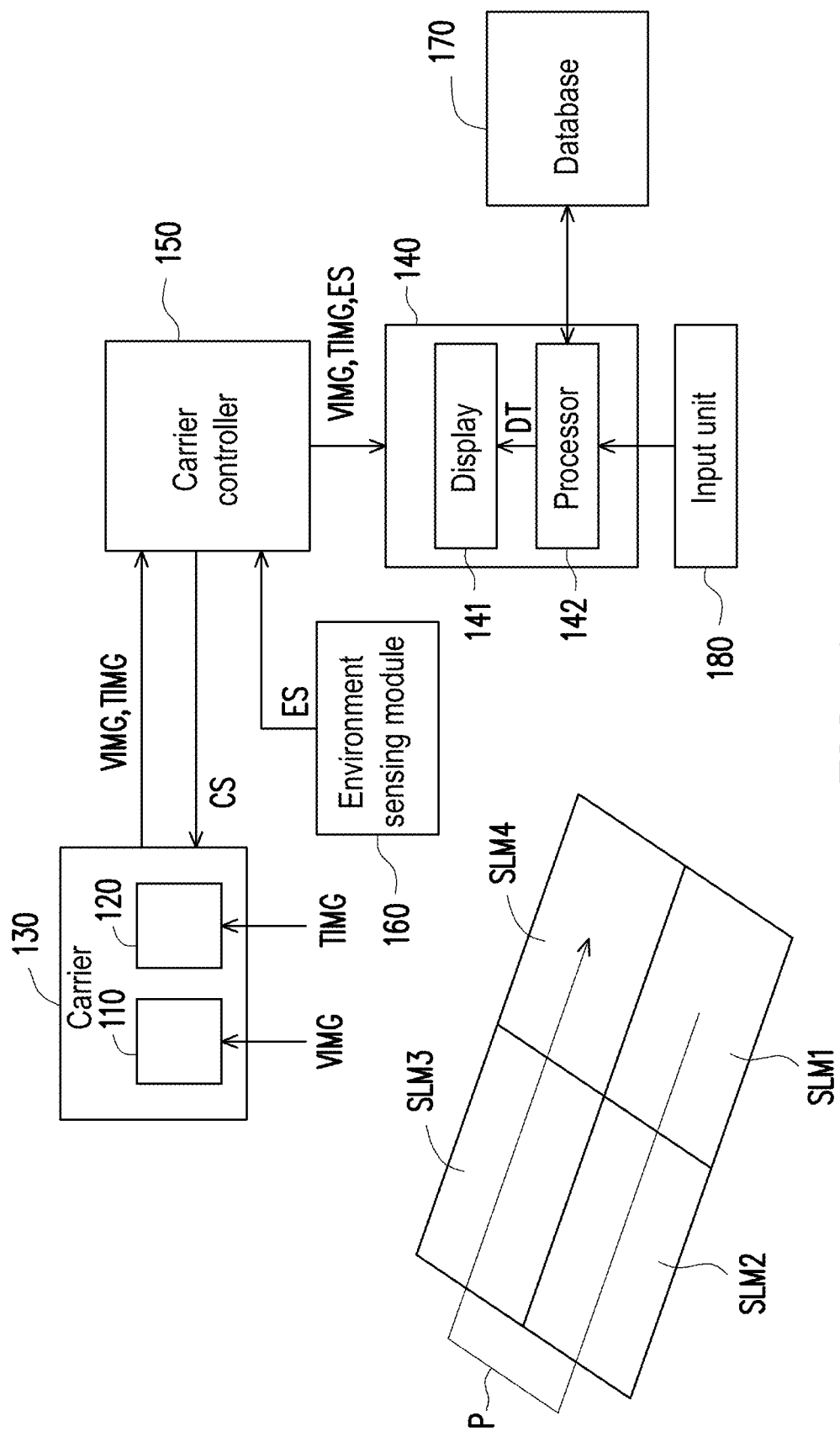
FIG. 1 is a schematic system view illustrating a solar module detection system according to an embodiment of the disclosure.

Referring to FIG. 1, FIG. 1 is a schematic system view illustrating a solar module detection system according to an embodiment of the disclosure. In the present embodiment, the solar module detection system is used to perform detection on solar modules SLM1 to SLM4. The solar module detection system includes a visible light image capturing device 110, a thermal image capturing device 120, a carrier 130, a host 140, a carrier controller 150, and an environment sensing module 160. The visible light image capturing device 110 captures visible light images VIMG of the solar modules SLM1 to SLM4. The thermal image capturing device 120 captures thermal images TIMG of the solar modules SLM1 to SLM4. The thermal images TIMG are associated with temperature distribution of the solar modules SLM1 to SLM4.

The carrier 130 carries the visible light image capturing device 110 and the thermal image capturing device 120. The carrier 130 moves the visible light image capturing device 110 and the thermal image capturing device 120 according to a moving path P. Therefore, the visible light image capturing device 110 captures the visible light images VIMG of the solar modules SLM1 to SLM4 along the moving path P. The thermal image capturing device 120 captures the thermal images TIMG of the solar modules SLM1 to SLM4 in operation along the moving path P. Further, the carrier controller 150 provides a configuration signal CS associated with the moving path P to the carrier 130. The carrier 130 may move along the moving path P according to the configuration signal CS. In the present embodiment, the carrier 130 may be, for example, an unmanned aerial vehicle or a telescopic rod. The carrier controller 150 may be, for example, a remote controller or a ground station. For example, if the carrier 130 is an unmanned aerial vehicle, the carrier controller 150 may be a remote controller or a ground station. The carrier controller 150 may be manipulated to plan a flight route of the carrier 130. Further, the carrier controller 150 may, for example, arrange a plurality of geographic coordinates in map software to provide the configuration signal CS associated with the moving path P. The carrier controller 150 may alternatively be manually manipulated to control fight of the carrier 130 in time. For another example, if the carrier 130 is a telescopic rod, the carrier controller 150 may be a wired controller or a remote controller. In the present embodiment, a capturing angle of the visible light image capturing device 110 is approximately equal to a capturing angle of the thermal image capturing device 120. Therefore, the visible light image capturing device 110 and the thermal image capturing device 120 may capture the visible light image VIMG corresponding to the solar module SLM1 and the thermal image TIMG corresponding to the solar module SLM1 simultaneously in a first time period. The visible light image capturing device 110 and the thermal image capturing device 120 may capture the visible light image VIMG corresponding to the solar module SLM2 and the thermal image TIMG corresponding to the solar module SLM2 simultaneously in a second time period later than the first time period. The rest may be deduced by analogy.

Since the visible light image capturing device 110 and the thermal image capturing device 120 are carried by the carrier 130, a long distance may be maintained between the solar modules SLM1 to SLM4 and the visible light image capturing device 110 and the thermal image capturing device 120. Therefore, the visible light image capturing device 110 and the thermal image capturing device 120 do not receive sunlight reflected from the solar modules SLM1 to SLM4 that causes a misjudgment on a thermal abnormality condition.

For ease of description, in the present embodiment, the number of the four solar modules SLM1 to SLM4 is used as an example. The disclosure is not limited to the number of the solar modules SLM1 to SLM4 in the present embodiment. The moving path P in the present embodiment may vary based on a usage requirement, and the moving path in the disclosure is not limited to the moving path P in the present embodiment. In some embodiments, the visible light image capturing device 110 and the thermal image capturing device 120 may be integrated into a single image capturing module. In the present embodiment, the carrier controller 150 further receives the thermal images TIMG and the visible light images VIMG. The carrier controller 150 provides the received thermal images TIMG and visible light images VIMG to the host 140 through wired transmission or wireless transmission by using any form of storage medium.

In the present embodiment, the environment sensing module 160 senses an environmental condition ES of the solar modules SLM1 to SLM4 being detected. For example, the environment sensing module 160 may receive a local weather condition from application software as the environmental condition ES. For another example, the environment sensing module 160 may be a sensing module including at least a luminometer and an anemometer.

In the present embodiment, the host 140 receives the thermal images TIMG, the visible light images VIMG, and the environmental condition ES. For example, the visible light image capturing device 110 may provide the visible light images VIMG to the carrier controller 150 by using any form of storage medium (such as an SD card). The thermal image capturing device 120 may provide the thermal images TIMG to the carrier controller 150 by using any form of storage medium (such as an SD card). For another example, the visible light image capturing device 110 may provide the visible light images VIMG to the carrier 130 through wired transmission. The thermal image capturing device 120 may provide the thermal images TIMG to the carrier 130, which are then provided to the carrier controller 150 through wireless transmission.

In the present embodiment, the host 140 includes a display 141 and a processor 142. The display 141 displays the thermal images TIMG and the visible light images VIMG. The processor 142 is coupled to the display 141. The processor 142 receives the thermal images TIMG and the visible light images VIMG. The processor 142 controls the display 141 to display the visible light images VIMG and the thermal images TIMG simultaneously. The processor 142 identifies a thermal abnormality condition of the solar modules SLM1 to SLM4 from the thermal images TIMG and locally analyzes and determines a defect type DT of the thermal abnormality condition according to the visible light images VIMG and the environmental condition. The processor 142 further controls the display 141 to display the thermal abnormality condition and the defect type DT. Understandably, when the solar modules SLM1 to SLM4 are identified as having no thermal abnormality condition, there is no defect type DT.

In the present embodiment, the display 141 may be, for example, a liquid crystal display (LCD), a light-emitting diode (LED), an organic light-emitting diode (OLED), or another display device that provides a display function, and a screen or a television that uses a cold cathode fluorescent lamp (CCFL) or an LED as a backlight module. The processor 142 may be, for example, a central processing unit (CPU) or another programmable general-purpose or special-purpose microprocessor, a digital signal processor (DSP), a programmable controller, an application-specific integrated circuit (ASIC), a programmable logic device (PLD) or another similar element, or a combination thereof, which may load and execute a computer program.

It should be noted herein that, the solar module detection system of the present embodiment uses the carrier 130 to carry the visible light image capturing device 110 and the thermal image capturing device 120. The visible light image capturing device 110 and the thermal image capturing device 120 may capture the visible light images VIMG and the thermal images TIMG of the solar modules SLM1 to SLM4 along the moving path P. In this way, when the solar modules SLM1 to SLM4 are in operation, time for capturing the visible light images VIMG and the thermal images TIMG may be reduced, and time required by a detection operation is also reduced. In addition, the processor 142 may determine the defect type DT of the thermal abnormality condition from the thermal images TIMG by using the visible light images VIMG. In this way, the present embodiment may improve correctness of detection on the solar modules SLM1 to SLM4.

For example, referring to FIG. 1 and FIG. 2 together, FIG. 2 is a schematic view illustrating a carrier controller and an operation interface according to an embodiment of the disclosure. In the present embodiment, the environment sensing module 160 is coupled to the carrier controller 150. Therefore, the carrier controller 150 may receive the environmental condition ES. In FIG. 2, the operation interface of the carrier controller 150 includes at least parts P1 and P2. The part P1 is manipulated to select a thermal image TIMG and a visible light image VIMG captured at a target time point, and migrate the thermal image TIMG and the visible light image VIMG from a source catalog into a destination catalog in a form of one or more files. For example, the carrier controller 150 may receive files corresponding to the thermal image TIMG and the visible light image VIMG from a catalog (the source catalog) in a storage medium (for example, an SD card), and store the files into a catalog (the destination catalog) of the carrier controller 150. Fields "RAW" and "RGB" are, for example, migration progresses of the thermal image TIMG and the visible light image VIMG respectively. The part P2 is configured to display the environmental condition ES. In the present embodiment, the environmental condition ES includes at least a wind speed, a solar radiation intensity, a cloud coverage, a flight height of the carrier 130, and an environment temperature. In the present embodiment, the solar module detection system provides reference to determination accuracy associated with the defect type DT according to the environmental condition ES. For example, an environmental condition ES with a wind speed less than 28 km/h, a cloud coverage less than 25%, and a solar radiation intensity greater than 600 W/m (the disclosure is not limited thereto) is a suitable environmental condition. That is, based on the suitable environmental condition, the solar module detection system may accurately identify a thermal abnormality condition and determine a defect type DT corresponding to the thermal abnormality condition. In some embodiments, when the suitable environmental condition is not met, for example, a cloud coverage is excessively high, a wind speed is excessively high, or a solar radiation intensity is obviously not enough, the solar module detection system provides, according to an environmental condition ES corresponding to such an unsuitable environmental condition, a warning indicating that determination accuracy associated with the defect type DT may be affected. Data in a plurality of fields in the part P2 may be respectively automatically loaded or manually loaded.

In the present embodiment, the solar module detection system further includes a database 170. The database 170 may be, for example, in wireless or wired communication with the host 140. The database 170 stores a plurality of defect types corresponding to a plurality of thermal abnormality conditions (not shown). The processor 142 identifies a thermal abnormality condition of the solar modules SLM1 to SLM4, and determines a defect type DT of the thermal abnormality condition corresponding to the solar modules SLM1 to SLM4 according to the visible light images VIMG and the database 170. In the present embodiment, the processor 142 may obtain the defect type DT of the thermal abnormality condition corresponding to the solar modules SLM1 to SLM4 from the database 170 through artificial intelligence (AI). In some embodiments, the database 170 may be configured in the host 140.

Figure 3:
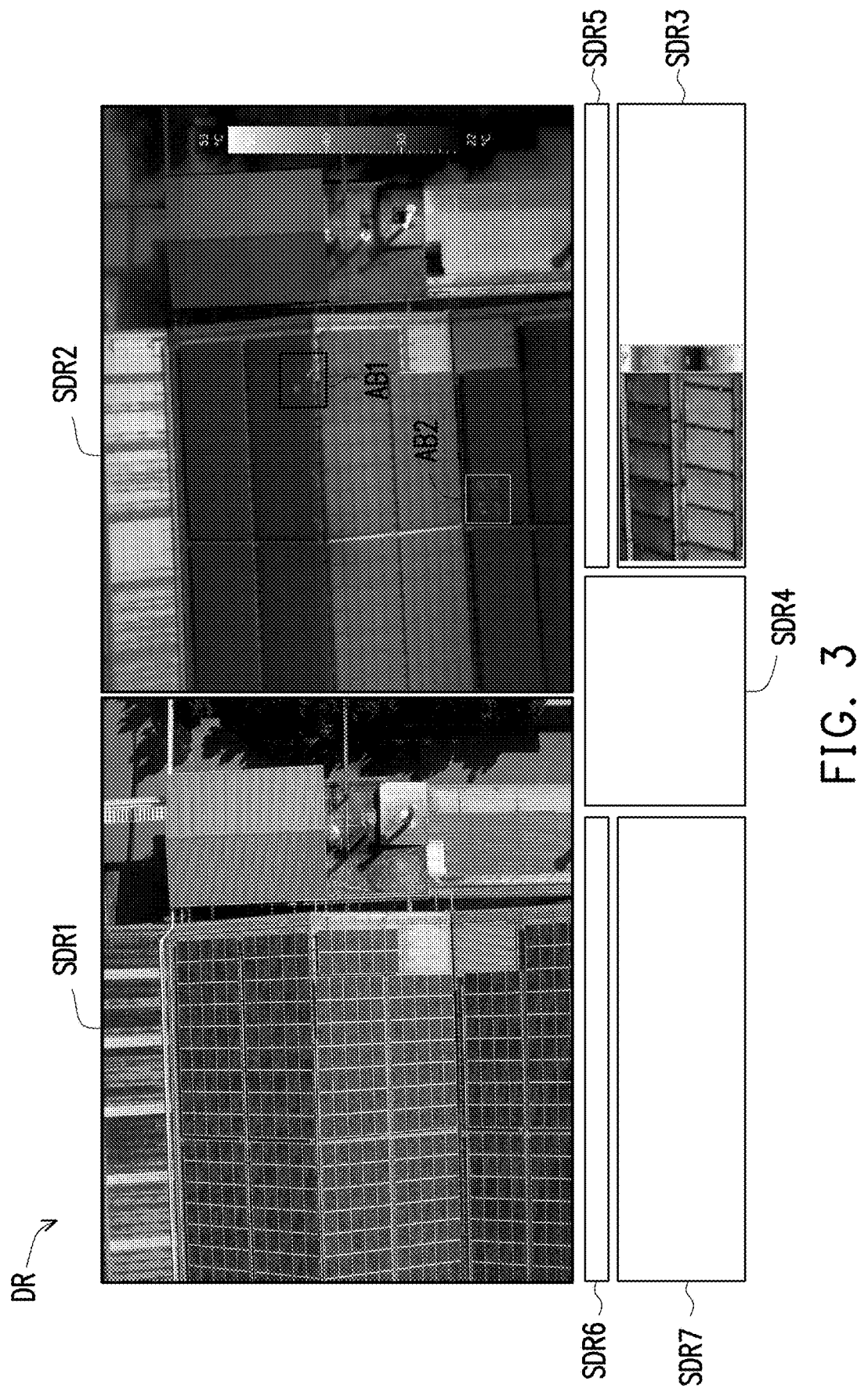
FIG. 3 is a schematic image illustrating a display region of a display according to an embodiment of the disclosure.

For further explanation, referring to FIG. 1 and FIG. 3 together, FIG. 3 is a schematic image illustrating a display region of a display according to an embodiment of the disclosure. In the present embodiment, a display region DR of the display 141 includes sub display regions SDR1, SDR2, and SDR3. The sub display region SDR1 is configured to play the visible light image VIMG. The sub display region SDR2 is configured to play the thermal image TIMG and display thermal abnormality conditions AB1 and AB2. In the present embodiment, the processor 142 identifies the thermal abnormality conditions AB1 and AB2 through AI and controls the display 141 to display the thermal abnormality conditions AB1 and AB2 in the sub display region SDR2. Further, the thermal abnormality conditions AB1 and AB2 are marked at locations where the thermal abnormality conditions AB1 and AB2 take place in the thermal image TIMG. In some embodiments, the processor 142 identifies the thermal abnormality conditions AB1 and AB2 through AI and controls the display 141 to display the thermal abnormality conditions AB1 and AB2 in the sub display regions SDR1 and SDR2. Further, the thermal abnormality conditions AB1 and AB2 may be marked at locations where the thermal abnormality conditions AB1 and AB2 take place in the visible light image VIMG and the thermal image TIMG. In the present embodiment, the visible light image VIMG and the thermal image TIMG are played simultaneously.

In the present embodiment, the solar module detection system further includes an input unit 180. The input unit 180 may be manipulated to zoom in or zoom out the visible light image VIMG displayed in the sub display region SDR1. The input unit 180 may be manipulated to zoom in or zoom out the thermal image TIMG displayed in the sub display region SDR2. For example, the input unit 180 may be any kind of mouse. A user clicks the sub display region SDR1 or the sub display region SDR2 by using the input unit 180, so that the host 140 may pause the visible light image VIMG and the thermal image TIMG being played simultaneously. The user scrolls a wheel in the sub display region SDR1 by using the input unit 180 (the disclosure is not limited thereto) to zoom in or zoom out the visible light image VIMG. The user scrolls a wheel in the sub display region SDR2 by using the input unit 180 to zoom in or zoom out the thermal image TIMG.

In the present embodiment, the input unit 180 is further manipulated to select a selected location in the thermal image TIMG. Then the processor 142 provides a temperature value corresponding to the selected location, and controls the display 141 to display the temperature value corresponding to the selected location. For example, when the visible light image VIMG and the thermal image TIMG are paused in playing, the user may select a selected location in the sub display region SDR2 by using the input unit 180. The processor 142 provides a temperature value corresponding to the selected location, and controls the display 141 to display the temperature value corresponding to the selected location.

The sub display region SDR3 is configured to display defect types DT corresponding to the thermal abnormality conditions AB1 and AB2, and illustrate a cause and a possible temperature difference range of the defect type DT. In addition, the sub display region SDR3 further includes an operation interface configured to read content of the database 170. The interface in the sub display region SDR3 may be manipulated to display one of the plurality of defect types (not shown) stored in the database 170, a thermal abnormality condition corresponding to the one defect type, and a thermal image example corresponding to the one defect type in the sub display region SDR3. In this way, the user may inspect content of the plurality of defect types in the database 170 and define the thermal abnormality conditions AB1 and AB2 by using the host 140. In some embodiments, the sub display region SDR3 further displays at least one suggested measure to exclude the thermal abnormality conditions.

In addition, in the present embodiment, the display region DR further includes a sub display region SDR4. The sub display region SDR4 includes an operation interface configured to adjust a playing speed or a playing time point of the visible light image VIMG and the thermal image TIMG. For example, the user may operate in the operation interface of the sub display region SDR4 by using the input unit 180 to simultaneously adjust the playing speed or the playing time point of the visible light image VIMG and the thermal image TIMG. In addition, the user may operate in the operation interface of the sub display region SDR4 by using the input unit 180 to play the visible light image VIMG and the thermal image TIMG normally or reversely.

Based on the foregoing teachings, the user may perform local analysis on the thermal image TIMG based on at least one of the foregoing operations, so as to identify the thermal abnormality conditions AB1 and AB2. In the present embodiment, alternatively, the host 140 may automatically search the thermal image TIMG being played, so as to identify the thermal abnormality conditions AB1 and AB2, and mark the locations thereof.

In some embodiments, the input unit 180 may be a touchpad, a stylus, a keyboard, or another input tool.

In the present embodiment, the host 140 may search the thermal image TIMG being played, and once the thermal abnormality conditions AB1 and AB2 are found, the host 140 pauses in playing the visible light image VIMG and the thermal image TIMG, and analyzes the thermal abnormality conditions AB1 and AB2 according to the visible light image VIMG. For example, the processor 142 may determine that a shading object (for example, a lightning conductor or an antenna) exists in the visible light image VIMG at a location corresponding to the thermal abnormality condition AB1. Therefore, the processor 142 determines that the thermal abnormality condition AB1 is not a defect in the module, but is a hot spot caused by a shade. For another example, the processor 142 may determine that no object exists in the visible light image VIMG at a location corresponding to the thermal abnormality condition AB2. Therefore, the host 140 determines that the thermal abnormality condition AB1 is a defect in the module. The processor 142 further determines a defect type DT of the thermal abnormality condition AB2. According to the image presented by the thermal abnormality condition AB2, the processor 142 may determine that the defect type DT of the thermal abnormality condition AB2 is thermal aggregation caused by loose contact. Further, the processor 142 may learn, by using the database 170, that the defect type DT of the thermal abnormality condition AB2 is thermal aggregation caused by loose contact. The processor 142 controls the display 141 to display the defect type DT of the thermal abnormality condition AB2 in the sub display region SDR3. In some embodiments, the processor 140 may further obtain, by using the database 170, at least one suggested measure to exclude the thermal abnormality condition AB2, and control the display 140 to display, in the sub display region SDR3, the at least one suggested measure to exclude the thermal abnormality condition AB2. It can be learned from the above that, the solar module detection system may automatically identify the thermal abnormality conditions AB1 and AB2 and determine the defect type DT (for example, through AI) by using the processor 142.

In the present embodiment, the display region DR further includes a sub display region SDR5. The sub display region SDR5 includes an operation interface configured to select a temperature display range and a temperature display mode in the sub display region SDR2, so as to provide an optimal temperature display mode of the second sub display region SDR2 and a local optimal temperature display mode in the second sub display region SDR2. In the present embodiment, the input unit 180 is configured to operate in the operation interface in the sub display region SDR5 to adjust the temperature display mode in the sub display region SDR2. For example, the location of the thermal abnormality condition AB2 in the thermal image TIMG displayed in the sub display region SDR2 is zoomed in based on the foregoing operation. The user may operate in the operation interface in the sub display region SDR5 by using the input unit 180 to optimize the temperature display mode in the sub display region SDR2. In this way, the solar module detection system may perform local analysis on the thermal image TIMG to significantly improve accuracy of manually identifying the thermal abnormality condition. It can be learned from the above that, the solar module detection system may identify the thermal abnormality condition and determine the defect type DT through user operations.

In the present embodiment, the input unit 180 is further manipulated to select a selected location in the thermal image TIMG. Then the processor 142 provides a temperature value corresponding to the selected location, and controls the display 141 to display the temperature value corresponding to the selected location. For example, when the visible light image VIMG and the thermal image TIMG are paused in playing, the user may select a selected location in the sub display region SDR2 by using the input unit 180. The processor 142 provides a temperature value corresponding to the selected location, and controls the display 141 to display the temperature value corresponding to the selected location.

In the present embodiment, the display region DR further includes sub display regions SDR6 and SDR7. The sub display region SDR6 displays the environmental condition ES of the thermal image TIMG and the visible light image VIMG being captured. In the present embodiment, the processor 142 may receive the environmental condition ES by using the carrier controller 150, and control the display 141 to display the environmental condition ES in the sub display region SDR6.

The sub display region SDR7 displays an operation interface configured to select a file to be detected. When a specific file is selected, a visible light image VIMG of the selected file is displayed in the sub display region SDR1, and a thermal image TIMG of the selected file is displayed in the sub display region SDR2. Based on an actual application requirement, the configuration of the sub display regions SDR1 to SDR7 may be changed, and the configuration of the sub display regions in the disclosure is not limited to the present embodiment.

Based on the above, the solar module detection system in the disclosure uses the carrier to carry the visible light image capturing device and the thermal image capturing device. The solar module detection system may capture the visible light image and the thermal image of the solar module along the moving path. In this way, when the solar module is in operation, time for capturing the visible light image and the thermal image may be reduced. The solar module detection system determines the defect type of the thermal abnormality condition of the thermal image by using at least the visible light image. In this way, the solar module detection system may improve accuracy of solar module detection. Moreover, the solar module detection system may further determine the defect type of the thermal abnormality condition in the thermal image through at least one of user operation and AI.

Although the disclosure has been described above by using the embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. A solar module detection system, comprising:
a visible light image capturing device, configured to capture a visible light image of at least one solar module along a moving path;
a thermal image capturing device, configured to capture a thermal image of the at least one solar module in operation along the moving path;
a carrier controller, configured to provide a configuration signal associated with the moving path;
a carrier, configured to carry the visible light image capturing device and the thermal image capturing device and move the visible light image capturing device and the thermal image capturing device along the moving path according to the configuration signal;
an environment sensing module, configured to sense an environmental condition of the at least one solar module being detected;
a host, comprising:
a display, configured to display the thermal image and the visible light image; and
a processor, coupled to the display and configured to control the display to display the visible light image and the thermal image synchronously, identify at least one thermal abnormality condition of the at least one solar module from the thermal image, locally analyze and determine at least one defect type of the at least one thermal abnormality condition according to the visible light image and the environmental condition, and control the display to display the at least one thermal abnormality condition and the at least one defect type; and
a database, configured to store a plurality of defect types corresponding to a plurality of thermal abnormality conditions,
wherein the processor identifies the at least one thermal abnormality condition of the at least one solar module and determines the at least one defect type of the at least one thermal abnormality condition, a cause of the at least one defect type of the at least one thermal abnormality condition, and a temperature difference range of the at least one defect type according to the visible light image and the database.

2. The solar module detection system according to claim 1, wherein a capturing angle of the visible light image capturing device is approximately equal to a capturing angle of the thermal image capturing device.

3. The solar module detection system according to claim 1, wherein the carrier is one of an unmanned aerial vehicle and a telescopic rod.

4. The solar module detection system according to claim 1, wherein the solar module detection system provides reference to determination accuracy associated with the at least one defect type according to the environmental condition.

5. The solar module detection system according to claim 1, wherein a display region of the display comprises:
a first sub display region, configured to play the visible light image;
a second sub display region, configured to play the thermal image and the at least one thermal abnormality condition; and
a third sub display region, configured to display the at least one defect type of the at least one thermal abnormality condition.

6. The solar module detection system according to claim 5, wherein the host further comprises:
an input unit, coupled to the host, and manipulated to:
zoom in/out the visible light image in the first sub display region;
zoom in/out the thermal image in the second sub display region; and
adjust at least one of a temperature display range and a temperature display mode in the second sub display region, so as to provide an optimal temperature display mode of the second sub display region and a local optimal temperature display mode in the second sub display region.

7. The solar module detection system according to claim 6, wherein
the input unit is further manipulated to select a selected location in the thermal image, and
the processor provides a temperature value corresponding to the selected location and controls the display to display the temperature value.

8. The solar module detection system according to claim 7, wherein
the display region further comprises a fourth sub display region, and
the fourth sub display region is manipulated through the input unit to:
adjust a playing speed of the visible light image and a playing speed of the thermal image,
adjust a playing time point of the visible light image and a playing time point of the thermal image, and
normally or reversely play the visible light image and the thermal image.

9. The solar module detection system according to claim 6, wherein the processor, through artificial intelligence (AI), identifies the at least one thermal abnormality condition and controls the display to display the at least one thermal abnormality condition in at least one of the first sub display region and the second sub display region.

* * * * *